United States Patent [19]
Pribak et al.

[11] Patent Number: 5,707,095
[45] Date of Patent: Jan. 13, 1998

[54] DUAL FUNCTION STRIKER PIN FOR VEHICLE TAILGATE ASSEMBLY

[76] Inventors: Martin S. Pribak, 38221 Ladywood Ct., Livonia, Mich. 48154; Paul Morris, 1624 Lyons, LaSalle, Ontario, Canada

[21] Appl. No.: 629,202

[22] Filed: Apr. 8, 1996

[51] Int. Cl.$^6$ .................................. B62D 33/03
[52] U.S. Cl. .................. 296/57.1; 16/82; 292/264; 292/340; 292/DIG. 29
[58] Field of Search ............... 296/57.1, 58, 61, 296/50; 16/82; 292/264, 262, 340, DIG. 29

[56] References Cited

U.S. PATENT DOCUMENTS

| | | | |
|---|---|---|---|
| 763,718 | 6/1904 | Byington | 296/57.1 |
| 1,735,930 | 11/1929 | Miller | 296/50 |
| 2,955,863 | 10/1960 | Olender | 292/264 |
| 3,591,225 | 7/1971 | Hagemeyer | 292/340 |
| 4,040,654 | 8/1977 | Hill et al. | 292/263 X |
| 4,529,351 | 7/1985 | Olins | 414/545 |
| 4,981,320 | 1/1991 | Bowman | 296/57.1 |

FOREIGN PATENT DOCUMENTS

| | | | |
|---|---|---|---|
| 3048-419 | 9/1982 | Germany | 296/57.1 |
| 179542 | 7/1990 | Japan | 296/57.1 |
| 4-27678 | 1/1992 | Japan | 296/50 |

*Primary Examiner*—Dennis H. Pedder
*Attorney, Agent, or Firm*—David B. Kelley

[57] ABSTRACT

A tailgate assembly for an automotive vehicle has a tailgate for providing access through an opening in the vehicle when in an open position and for blocking access through the opening when in a closed position. A pair of dual function striker pins, one on each side of the opening, provide a striker shoulder for interaction with a tailgate locking mechanism and a cable shoulder for receiving an end of a tailgate retention cable. A separator between the striker shoulder and the cable shoulder prevents the cable from sliding from the cable shoulder onto the striker shoulder.

8 Claims, 3 Drawing Sheets

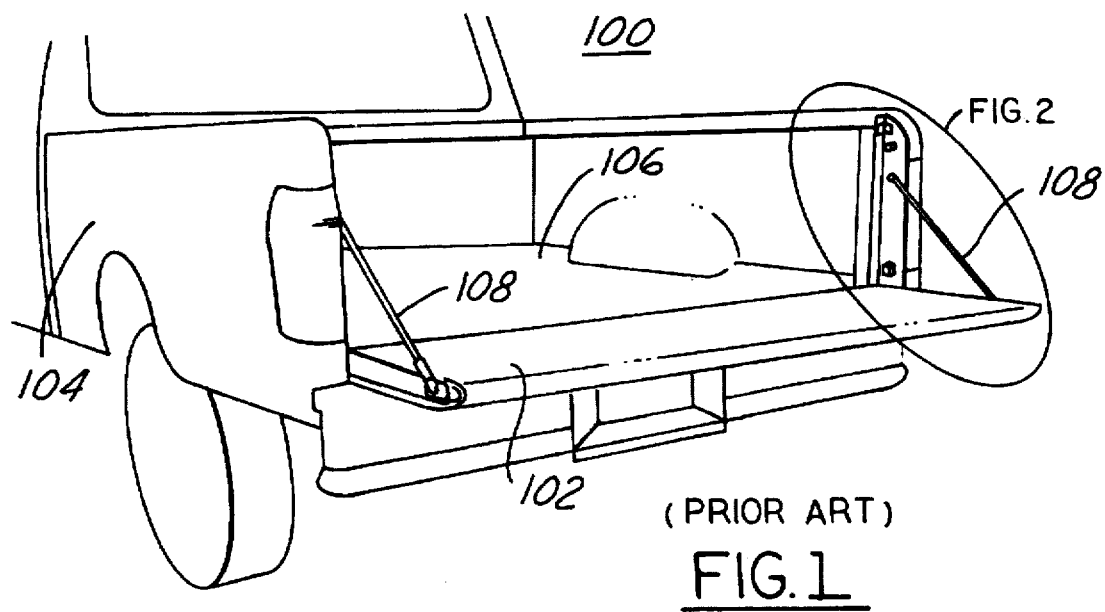
(PRIOR ART)
FIG. 1
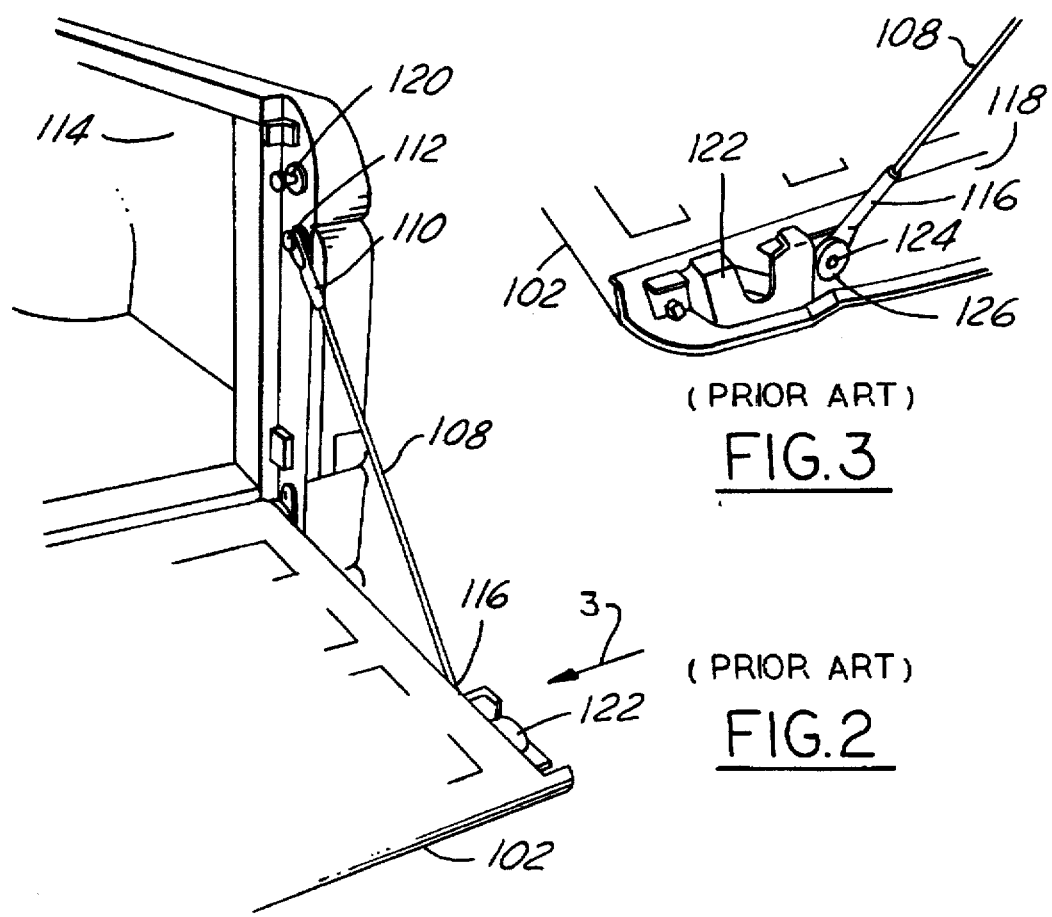
(PRIOR ART)
FIG. 3
(PRIOR ART)
FIG. 2

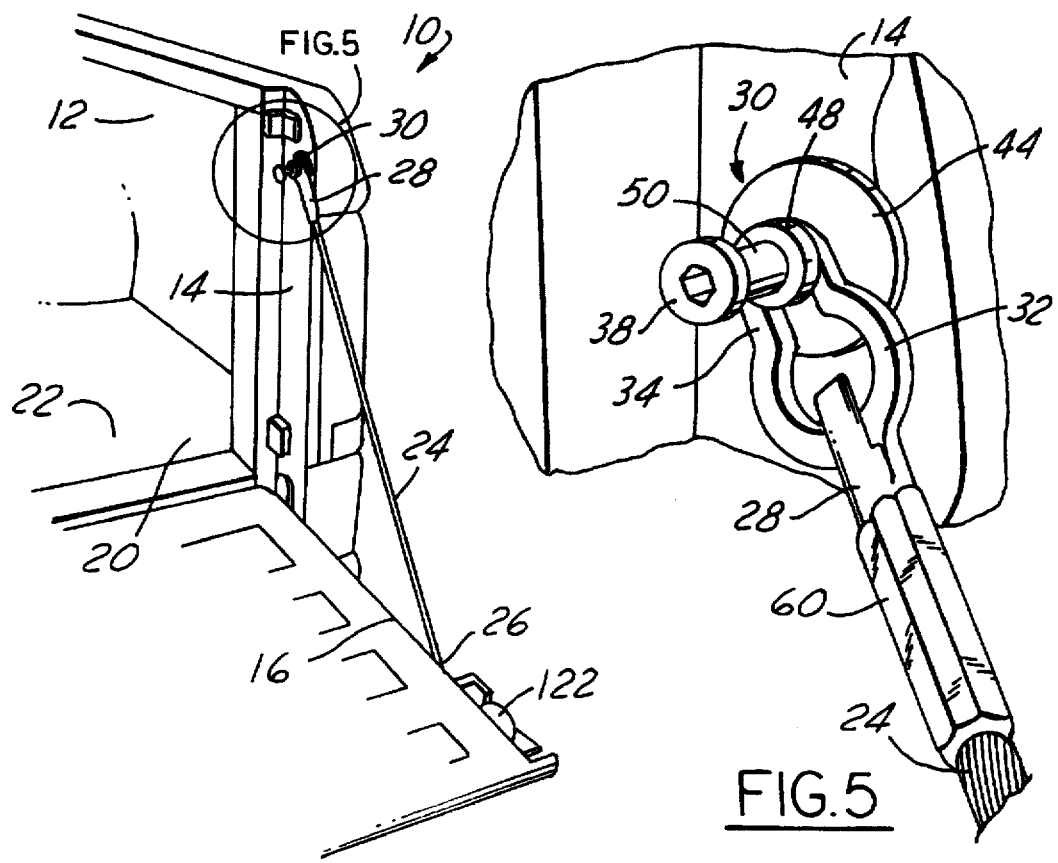
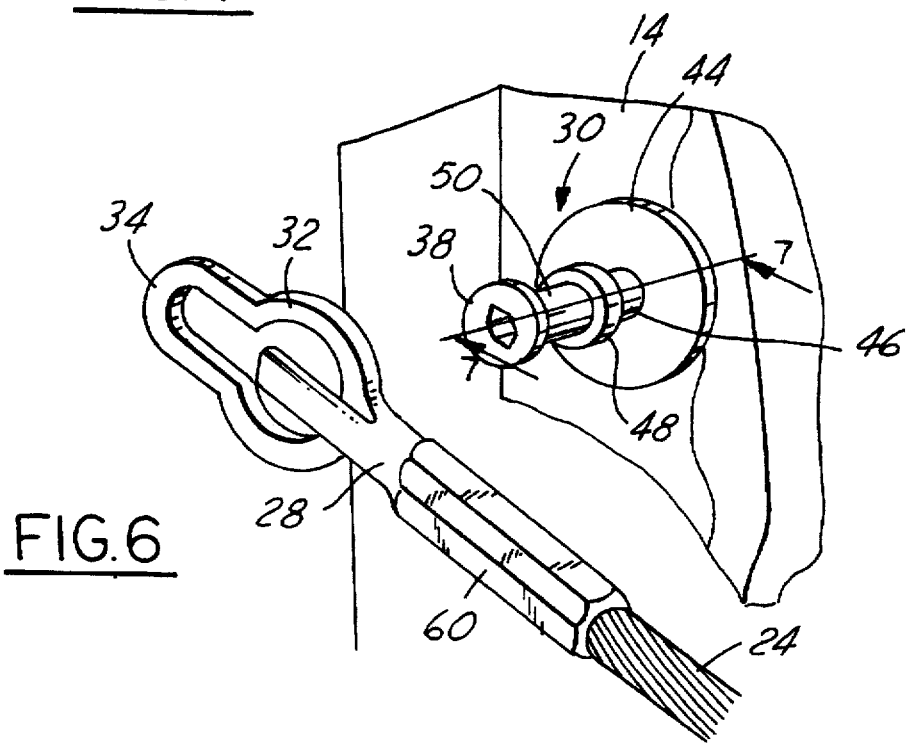

5,707,095

DUAL FUNCTION STRIKER PIN FOR VEHICLE TAILGATE ASSEMBLY

FIELD OF THE INVENTION

The present invention relates generally to automotive vehicle tailgates, and, more particularly, to striker pins for tailgate assemblies.

BACKGROUND OF THE INVENTION

As seen in FIG. 1, an automotive vehicle, such as a pick-up truck 100, typically has a tailgate 102 hingedly attached to the vehicle body 104 for allowing access to a cargo bed area 106. When open, a set of cables 108 retains the tailgate 102 in a predetermined position, for example roughly horizontal, as seen in FIG. 1. The cables 108 are attached on one end 110 (FIG. 2) to a connector pin 112 extending from a rear side panel 114, and on the other end 116 (FIG. 3) to a side 118 of the tailgate 102. A separate striker pin 120 on the rear side panel 114 (FIG. 2) interacts with the tailgate locking mechanism 122 (FIG. 3) to latch the tailgate 102 with the vehicle body 104 when the tailgate 102 is closed. The described construction contemplates two separate pins, the connector pin 112 and the striker pin 120, both attached to the rear side panel, which may not be the most efficient use of resources.

Various prior tailgate constructions utilize a retention device, such as a cable, chain, or set of linkages, to hold a tailgate in a predetermined position when detached from a locking mechanism. For example, U.S. Pat. No. 1,735,930 (Miller) employs pins E which are attached to chains M to retain a gate for a dump truck in a horizontal position. The gate is maintained in a vertical disposition by metal straps G and pins P. In U.S. Pat. No. 763,718 (Byington), a wagon has an endgate which, in the horizontal position, is supported by links 15 and a bail 12 which extends across the entire length of the end gate. The end gate is maintained in a vertical position by latches 20 which are pivoted on a horizontal axis. In U.S. Pat. No. 2,955,863 (Olender), a pick up truck tailgate mounted bracket 9 extends over hook 3 in the vertical position of the tailgate. A pin 31 is attached to handle 15 is located within a slot formed by the hook to retain the tailgate in a vertical position. Also, in U.S. Pat. No. 4,529,351 (Olins), a combination of latch members 27 attached to a pivoted tailgate and latching jaws 30 and 32 is disclosed which extend across the latch members to retain the tailgate in its vertical position. None of the foregoing disclose, however, the advantageous tailgate assembly with a dual function striker pin of the present invention.

SUMMARY OF THE INVENTION

In response to use of multiple striker pins and tailgate retainer pins in the related art, the present invention provides a tailgate assembly comprising a tailgate for providing access through an opening in a vehicle body when in an open position and blocking access through the opening when in a closed position, a locking mechanism on the tailgate for maintaining the tailgate in the closed position, at least one cable connecting the tailgate with the vehicle body, the at least one cable having a first end attached to the tailgate, and at least one pin on the vehicle body having a first shoulder for interaction with the locking mechanism and a second shoulder for receiving a second end of the cable.

In a preferred embodiment, the dual function striker pin comprises a bolt, with a bolt head, attached to one of the pair of rear side panels, a cable sprocket mounted to the bolt and having a flange abutting the one of the pair of rear side panels and a cable shoulder of smaller diameter than the flange, and a striker portion mounted over the bolt between the cable sprocket and the bolt head with a separator of larger diameter than the cable shoulder abutting thereagainst, and with a striker shoulder between the separator and the bolt.

An advantage of the present invention is a tailgate assembly which requires fewer parts than conventional tailgate assemblies.

Another advantage is a tailgate assembly which is easy to assemble and inexpensive to manufacture.

A feature of the present invention is a tailgate striker pin which has both a striker shoulder and a cable end retention shoulder.

BRIEF DESCRIPTION OF THE DRAWINGS

These and other objects, advantages and features of the present invention will be apparent to those skilled in the vehicle tailgate assembly arts upon reading the following description with reference to the accompanying drawings, in which:

FIG. 1 is a rear perspective view of a prior art vehicle tailgate assembly;

FIG. 2 is a close-up perspective view of a portion of the prior art tailgate assembly of FIG. 1;

FIG. 3 is a perspective view of a prior art tailgate locking mechanism;

FIG. 4 is a perspective view of a tailgate assembly according to the present invention showing a dual function striker pin;

FIG. 5 is a perspective close-up view of a dual function striker pin of the present invention shown with a cable end attached thereto;

FIG. 6 is perspective view of the dual function striker pin of FIG. 5 shown with the cable end detached therefrom;

DETAILED DESCRIPTION OF THE PREFERRED EMBODIMENT

Figure 8:
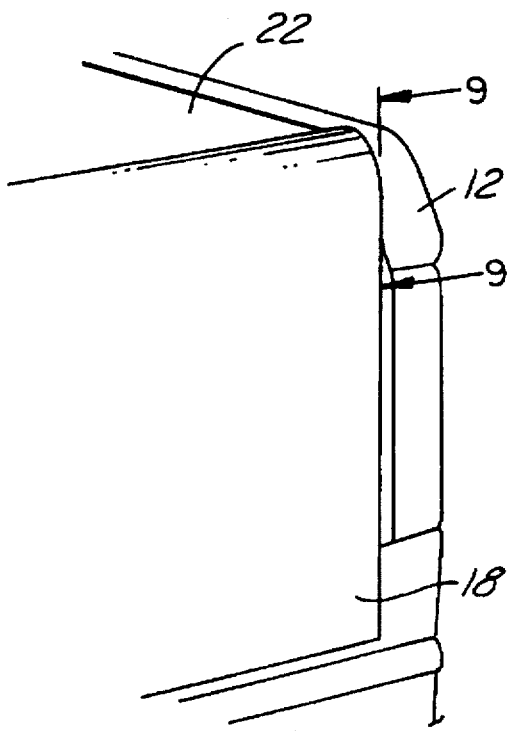
FIG. 8 is a partial, rear perspective view of a tailgate assembly of the present invention shown with the tailgate in a closed position.

Turning to FIG. 4 of the drawings, a portion of a rear section 10 of a vehicle similar to that of FIG. 1 is shown with a tailgate assembly according to the present invention. It will be understood that while only one side of the tailgate assembly is shown, the other side can be analogously made if desired. In FIG. 4, side panel 12 has an inner ledge 14 constructed so as to receive an edge 16 of a tailgate 18. The tailgate 18 allows access through an opening 20 to a cargo bed 22 when in the open position (FIG. 4) and blocks access there through when in a closed position (FIG. 8).

Still referring to FIG. 4, the tailgate 18 is retained in a substantially horizontal position when open by retention means, such a cable 24. Those skilled in the art will recognize that other retaining means, such as a chain or folding linkages may also be used. The first end 26 of the cable 24 attaches to the tailgate 18, in a fashion similar to attachment of end 116 in FIG. 3, for example with a rivet 124 and washer 126. A second end 28 of the cable 24 attaches to a dual function striker pin 30 (FIG. 5) which is described more fully below. The cable end 28 preferably has a loop 32 which fits over the striker pin 30 and has an extension portion 34 (FIG. 6).

Figure 7:
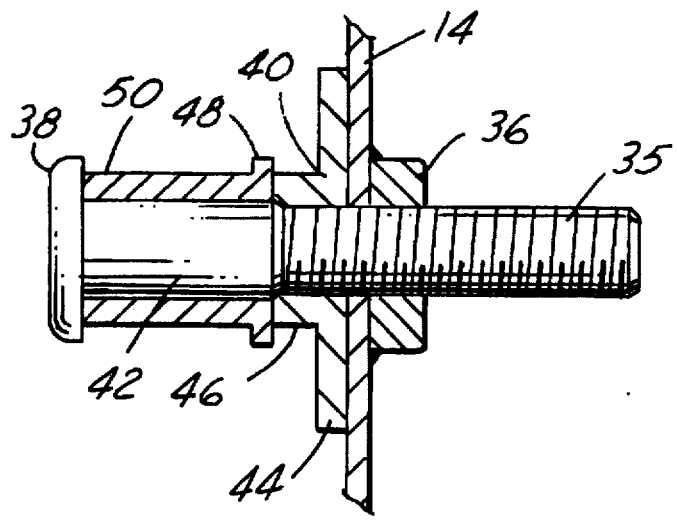
FIG. 7 is a cross-sectional view taken along line 7—7 of the dual function striker pin of FIG. 6.

The dual function striker pin 30 is constructed so as to provide a location for attachment of one end of the cable 24 as well as a pin for interaction with a locking mechanism 122 on edge 16 of the tailgate 18 (FIG. 4). To accomplish both functions at a single location, a preferred embodiment of the dual function striker pin 30 of the present invention has a bolt 35 attached through the ledge 14 sheet metal into a weld nut 36 (FIG. 7). Those skilled in the art will recognize that the weld nut 36 is out of sight with respect to the vehicle body exterior. The bolt 35 is attached so that a head 38 remains a predetermined distance from the ledge 14, as seen in FIG. 7. A cable sprocket 40 and a striker portion 42 are preferably mounted onto the bolt 35 before attachment to the weld nut 36. The cable sprocket 40 has a flange 44 which abuts the ledge 14 and a cable shoulder 46 actually along the bolt 35 away from the ledge 14. As seen in FIGS. 5&6, the cable shoulder 46 receives the extension portion 34 of the loop 32. The loop 32 is sized so as to fit over the bolt head 38. Tension in the cable 24, due to weight of the tailgate 18 thereon, draws the extension portion 34 over the cable shoulder 46.

Figure 9:
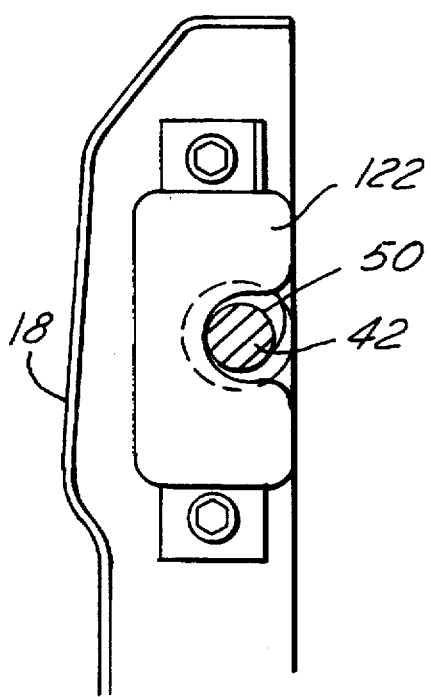
FIG. 9 is a cross-sectional view taken along line 9—9 of FIG. 8.

Referring again to FIG. 7, the striker portion 42 has a striker shoulder 50 and a separator 48. The separator 48 is located between the cable shoulder 46 and the striker shoulder 50 to prevent the extension portion 34 from sliding from the former onto the latter, as seen in FIG. 5. The striker shoulder 50 interacts with the locking mechanism 122 of the tailgate 18 in a known fashion (FIGS. 8&9).

The cable sprocket 40 and the striker portion 42 are preferably made of a durable plastic material, or alternatively can be made of a metallic material. The loop 32 and extension portion 34 can be made of an integrally molded flexible rubber material and can be attached to the cable 24 with a crimping portion 60 (FIGS. 5&6).

Although the preferred embodiment of the present invention has been disclosed, various changes and modifications may be made without departing from the scope of the invention as set forth in the appended claims.

We claim:

1. In an automotive vehicle having a vehicle body with an opening there through, a tailgate assembly comprising:
    (1) a tailgate for providing access through the opening when in an open position and blocking access through the opening when in a closed position;
    (2) a locking mechanism on the tailgate for maintaining the tailgate in the closed position;
    (3) at least one cable connecting the tailgate with the vehicle body, the at least one cable having a first end attached to the tailgate; and
    (4) at least one pin on the vehicle body having:
        (a) a first shoulder for interaction with the locking mechanism; and
        (b) a second shoulder for receiving a second end of the cable.

2. A tailgate assembly according to claim 1 wherein the at least one pin has a separator between the first shoulder and the second shoulder to prevent the cable from moving from the second shoulder to the first shoulder.

3. A tailgate assembly according to claim 1 wherein the second shoulder is between the vehicle body and the first shoulder.

4. A tailgate assembly according to claim 1 wherein the second end of the cable has a loop for attachment to the second shoulder.

5. A tailgate assembly according to claim 4 wherein the loop has an extension portion of width less than the diameter of the separator to prevent the second end of the cable from moving onto the first shoulder.

6. In an automotive vehicle having a vehicle body with a pair of opposed rear side panels bounding a storage area having a rearwardly facing opening therein, an improved tailgate assembly comprising:
    (1) a tailgate for providing access through the opening when in an open position and blocking access through the opening when in a closed position;
    (2) a locking mechanism on the tailgate for maintaining the tailgate in the closed position;
    (3) at least one cable connecting the tailgate with the vehicle body, the at least one cable having a first end attached to the tailgate; and
    (4) striker pin means on the vehicle body for interacting with the locking mechanism to maintain the tailgate in the closed position and for receiving a second end of the cable to maintain the tailgate in a predetermined position with respect to the vehicle body when the tailgate is in the open position.

7. A tailgate assembly according to claim 6 wherein the striker pin means comprises a striker pin having a first shoulder for interacting with the locking mechanism and a second shoulder for receiving the second end of the cable.

8. In a pick-up truck having a vehicle body including a pair of opposed rear side panels bounding a cargo bed and defining a rearwardly facing opening, an improved tailgate assembly comprising:
    (1) a tailgate for providing access through the opening when in an open position and blocking access through the opening when in a closed position;
    (2) at least one dual function striker pin on one of the pair of opposed rear side panels, the at least one striker pin comprising:
        (a) a bolt, with a bolt head, attached to one of the pair of rear side panels;
        (b) a cable sprocket mounted to the bolt and having a flange abutting the one of the pair of rear side panels and a cable shoulder of smaller diameter than the flange; and
        (c) a striker portion mounted over the bolt between the cable sprocket and the bolt head with a separator of larger diameter than the cable shoulder abutting thereagainst, and a striker shoulder between the separator and the bolt;
    (3) at least one cable having a first end connected to the tailgate and a second end connected to the cable shoulder of the at least one striker pin; and
    (4) a locking mechanism on the tailgate for interaction with the striker shoulder to latch the tailgate in the closed position to the pair of opposed rear side panels.

* * * * *